Oct. 29, 1968 K. E. GANSKE ET AL 3,408,016
TAPE TRANSPORT APPARATUS
Filed Feb. 21, 1967
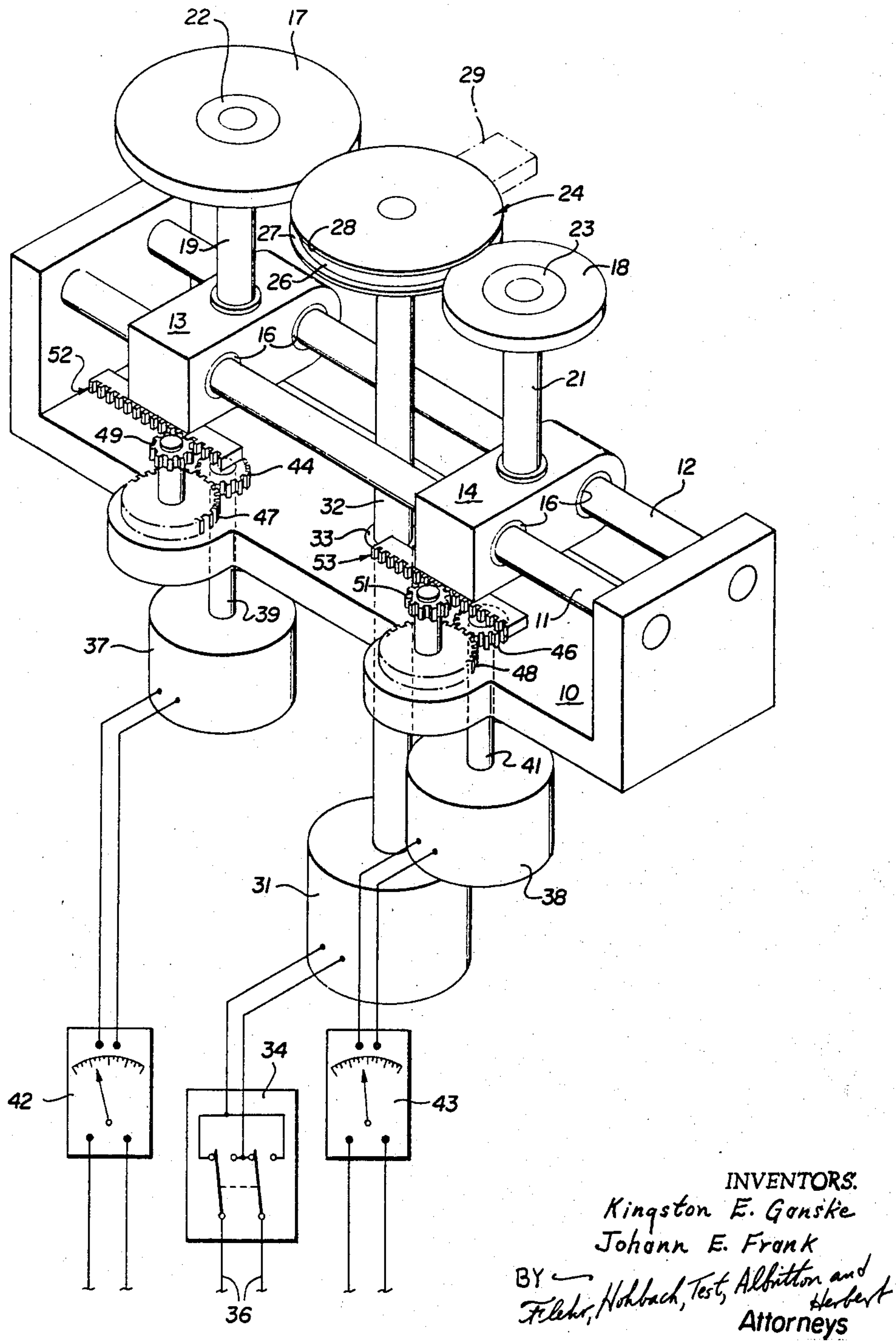
INVENTORS.
Kingston E. Ganske
Johann E. Frank
BY
Flehr, Hohbach, Test, Albritton and Herbert
Attorneys United States Patent Office 3,408,016
Patented Oct. 29, 1968

3,408,016
TAPE TRANSPORT APPARATUS

Kingston E. Ganske, Columbus, Ind., and Johann E. Frank, Yellow Springs, Ohio, assignors to Newell Associates, Inc., Sunnyvale, Calif., a corporation of California Filed Feb. 21, 1967, Ser. No. 617,639
6 Claims. (Cl. 242—55.12)

ABSTRACT OF THE DISCLOSURE

A tape transport apparatus including a resilient rotary drive capstan interposed between the supply and take-up rolls of tape to transport the tape therebetween, and torque motor means urging the rolls of tape into edge driving relationship with the capstan to apply a first compressive force between the supply roll and the capstan and a second greater compressive force between the take-up roll and capstan whereby the tape is transported under appropriate tension.

This invention pertains to a tape transport apparatus and more particularly to improvements in tape transport apparatus of a type as disclosed in copending application Ser. No. 480,324, now Patent No. 3,370,803, assigned to the assignee herein, employing differential tape pressures applied across a drive capstan, as explained below.

In the above identified application, there is discolsed a tape transport apparatus including a resilient rotary drive capstan arranged in edge or "rim" driving relation with respect to supply and take-up rolls of tape. Means are provided for urging both the supply and take-up rolls into contacting relation with the resilient drive capstan and to develop a compressive force between the take-up roll and capstan which is greater than the compressive force developed between the supply roll and capstan. In the foregoing manner, tape being fed from the supply to the take-up roll is transported under appropriate tension.

The term "edge"-driven as used herein refers to the edge of a roll as distinguished from the edges of the tape filament. The term "rim"-driven, as sometimes used, while descriptive, is believed inaccurate due to the usual absence of any rim.

In general, it is an object of the present invention to provide improved tape transport apparatus of the above kind including improved means for developing the differential in forces applied to the supply and take-up rolls.

In apparatus where supply and take-up rolls are edge driven by a capstan, the occurrence of a splice, dirt, or other variation in tape thickness, can tend to produce a slight bounce in the roll of tape. Each revolution causes the roll to produce a regenerative development known as "spoke wheeling."

The energy which tends to cause the rolls to bounce away from the capstan is derived from the rotating rolls themselves. Hence, in an effort to minimize the bounce movement, if a large mass were applied to the rotating roll, it would merely cause the roll to ride the high spots of the capstan. As disclosed herein, however, the vibration energy developed in the rolls is absorbed by the means for applying the force differential across the drive capstan. The operation of the apparatus advantageously provides this damping effect in a unidirectional manner. Thus, the roll may move freely into the capstan but is arranged whereby a large inertia will be applied to resist movement away from the capstan.

By applying a large inertial force to the rolls, it is possible to lower the resonant frequency of vibration of each of the rolls to a point sufficient to avoid similar vibrations occurring at operational speeds.

Another object of the invention is to provide an improved tape transport apparatus of the kind described wherein inertial damping is applied to the supply and take-up rolls of tape.

A further object of the invention is to provide means whereby a force differential can be created across the capstan for pressing the take-up roll against the capstan with a greater force than the supply roll is pressed thereagainst and wherein, upon termination of applied electrical power, the compressive forces will be removed, thereby safeguarding against the development of "flat spots" formed between a roll and the capstan should such forces not be removed during prolonged periods of non-use.

Further objects and features of the invention will appear from the following description in which the preferred embodiment of the invention has been set forth in detail in conjunction with the accompanying single figure of the drawing which schematically shows tape transport apparatus according to the invention.

In general, and according to a preferred embodiment, there is provided a tape transport of a type adapted to support a length of pliable recording tape wrapped to form supply and take-up rolls. A resilient drive capstan is arranged whereby rotation of the capstan serves to feed tape from the supply to the take-up roll.

Torque motor means serve to urge the tape against the peripheral surface of the capstan in a manner applying first and second compressive forces respectively between the supply side and capstan and between the take-up side and capstan. The compressive force on the take-up side is (for reasons explained fully in the above identified application) greater than that compressive force applied on the supply side whereby during transfer of tape from the supply roll to the take-up roll, the tape carried by the capstan is under appropriate tension.

Referring to the drawing which schematically represents a preferred embodiment of the invention, the transport apparatus comprises a base plate 10 or other suitable supporting platform. A pair of parallel spaced ways in the form of rods 11, 12 are suitably supported in spaced relation above the surface of platform 10 by the upturned ends of platform 10. A pair of carriages 13, 14 are supported for lateral translation on rods 11, 12 as by means of roller bearings represented by the bushings 16.

A supply roll 17 and take-up roll 18 are supported for rotation by means of axles 19, 21 which rotate in bushings extending downwardly into the carriages 13, 14. At the upper end of each axle 19, 21, a hub 22, 23, respectively, is carried for supporting the rolls of tape wrapped therearound.

A drive capstan assembly 24 has been interposed between supply and take-up rolls 17, 18 and includes a resilient peripheral surface 26 disposed to contact rolls 17, 18 in edge driving relation thereto. Capstan assembly 24 includes a pair of flanges 27, 28, one of which (preferably the upper one) is spring-loaded axially toward the other in order to yieldingly engage the opposite edges of adjacent convolutions of tape carried by rolls 17, 18. A magnetic recording transducer assembly 29 cooperates with the tape as it passes around capstan assembly 24.

From the foregoing, it is clear that the supply and take-up rolls 17, 18 are supported for rotation and for lateral translation with respect to the drive capstan. Accordingly, during feeding of tape between the rolls, the supply and take-up rolls respectively advance and retreat relative to the capstan periphery 26. Capstan assembly 24 is rotated by a reversible drive motor 31 driving a shaft 32 journalled, as at 33, in platform 10. Motor 31 is under control of a reversing switch 34 connected by leads 36 to a suitable power supply.

Means now to be described in the form of motors generate forces serving to urge the supply and take-up rolls toward the capstan periphery 26.

A pair of torque motors 37, 38 are respectively coupled to an adjustable power supply whereby the degree of torque generated on the output shafts 39, 41 can be varied. Thus, variable current control devices 42, 43 are arranged to vary their respective output forces as generated by each of motors 37, 38.

Motors 37, 38 are supported with respect to platform 10 by any suitable means (not shown). The output shafts 39, 41 are journalled for rotation through platform 10 and are each provided with a pinion gear 44, 46 forming a portion of a drive train wherein the torque developed by shafts 39, 41 is multiplied before being applied to move carriages 13, 14. Thus, pinions 44, 46, respectively, cooperate with a gear train including bull gears 47, 48 in mesh therewith and smaller pinion gears 49, 51 mounted for rotation with the shaft carrying gears 47, 48 respectively. Pinion gears 49, 51, respectively, engage an associated rack 52, 53 fixed to carriages 13, 14. Thus, on the supply side, torque motor 37 develops a force which is transmitted via the drive train to carriage 13 and serves to urge carriage 13 toward capstan assembly 24. Similarly, on the take-up side, torque motor 38, working through a drive train, serves to urge carriage 14 toward capstan assembly 24.

In operation, it is desired to apply a greater compressive force between the take-up roll 18 and capstan periphery 26 than is applied between supply roll 17 and surface 26, at least during a portion of the transfer of a roll of tape. While it is apparent that controls 42, 43 can be manipulated in order to provide more torque from motor 38 than from motor 37, or vice versa as desired, it has been observed that even though both motors 37, 38 are operated to generate equal torque as measured at their shafts 39, 41 the forces applied at the capstan periphery will develop a desired differential. The term "applied force," therefore, refers to the compressive force developed at the capstan periphery, taking into consideration, to the extent necessary, gear train losses and any hysteresis effect of the motors 37, 38.

Thus, it has been observed that each drive train serves to dissipate a portion of the generated forces developed by motors 37, 38. By the arrangement shown, the applied force urging the supply roll 17 and capstan together is reduced relative to the applied force urging take-up roll 18 and capstan 24 together, even though controls 42, 43 are set whereby the forces generated on output shafts 39, 41 are the same.

Accordingly, during the unwrapping of tape from supply roll 17, torque motor 37 acts through its associated drive train to advance carriage 13 and the axis of rotation of supply roll 17 toward capstan assembly 24. Resistance, encountered in the drive train, serves to dissipate a portion of the force developed by motor 37 so that the force which is applied between roll 17 and capstan periphery 26 is less than the force generated by torque motor 37 when measured at shaft 39.

Simultaneously, on the take-up side, torque motor 38 and its drive train serve to introduce a resistance force which is additive to the shaft force developed by motor 38 so as to increase the applied force found between take-up roll 18 and capstan periphery 26. Thus, as tape is wound about hub 23, motor 38 acts through its associated drive train to urge carriage 14 and the axis of rotation of the take-up roll toward capstan assembly 24. The axis of rotation of take-up roll 18 retreats from capstan assembly 24 during winding of tape thereon. In short, resistance caused by friction and other mechanical drag forces encountered in the drive train of motor 38 are oriented to resist this retreating movement of take-up roll 18 so as to become additive to the force otherwise developed at shaft 41 of motor 38.

From the foregoing, it should be apparent that even though the forces developed on shafts 39, 41 might be the same, the applied forces at capstan periphery 26 will be greater between the take-up roll 18 and capstan assembly 24 than between supply roll 17 and capstan periphery 26.

It will also be evident that upon the occasion of either a loss of power to motors 37, 38 or upon disconnecting the apparatus when it is not in use, the applied forces between capstan assembly 24 and rolls 17, 18 will be relieved. Thus, extended periods of non-use provide no tendency to develop flat spots on the rolls where the rolls rest against the resilient capstan surface.

Further, it will be clear from the foregoing that any tape surface irregularity as caused by the existence of a splice, dirt, or other deformity which might otherwise tend to cause a roll to bounce away from the capstan surface becomes immediately damped by virtue of the fact that the gear train magnifies the "fly wheel" inertia effect of motors 37, 38 whereby any tendency for the rolls to bounce away from the capstan surface is immediately met by what appears to be a large mass. On the other hand, rolls 17, 18 move freely toward engagement with the drive capstan due to the existence of backlash in the gear train. Finally, while a force differential applied across capstan assembly 24 can be developed by means of controls 42, 43, it is also apparent that equal forces generated at shafts 39, 41 also produce a force differential applied to the capstan drive surface 26 which is sufficient to effect appropriate tape tensioning.

Finally, in another embodiment, it has been found that the drive train can be minimized whereby pinions 44, 46 can be directly coupled to drive the racks 52, 53 while preserving sufficient differential in applied forces to effect appropriate tape tensioning.

What is claimed is:

1. In a tape transport of the type adapted to support a length of pliable recording tape wrapped to form supply and take-up rolls, a drive capstan, means for supporting each of said rolls for rotation and for lateral translation with respect to said capstan whereby during feeding of tape, said supply and take-up rolls respectively advance and retreat with respect to the capstan, a motor for driving said capstan, a resilient peripheral surface around the capstan, motive means generating forces serving to urge the supply and take-up rolls into edge driven relation with respect to said peripheral surface to apply first and second compressive forces respectively between the supply roll and capstan and between the take-up roll and capstan, drive train means interposed to operatively couple said motive means to so urge said supply and take-up rolls, said drive train means including resistance dissipative of a portion of the generated forces developed by said motive means for urging said supply roll to advance toward said capstan and including resistance additive to the force generated by said motive means for urging said take-up roll toward said capstan to resist retreating movement thereof, said drive train means serving to relatively reduce the applied force urging said supply roll and capstan together as compared to the applied force urging said take-up roll and capstan together.

2. A tape transport of the type adapted to support a length of pliable recording tape wrapped to form supply and take-up rolls, a drive capstan, first and second carriage means for respectively supporting each of said rolls for independent rotation and for independent lateral translation with respect to said capstan, a motor for driving said capstan, a resilient peripheral surface around the capstan, first torque motor means and first drive train means operatively coupled to said first carriage means to urge the supply roll into edge driven contact relation with respect to said peripheral surface, second torque motor means and second drive train means operatively coupled to said second carriage means to urge the take-up roll into edge driven contact relation with respect to said peripheral surface, said first and second drive trains including a rack and pinion gear serving to transmit forces developed by the torque motors to their respective carriages, resistance in said first drive train serving to dissipate a portion of the forces developed by its associated torque motor, and resistance in said second drive train being additive to the applied forces developed by its associated torque motor.

3. A tape transport of the type adapted to support a length of pliable recording tape wrapped to form supply and take-up rolls, a drive capstan, first and second carriage means for respectively supporting each of said rolls for independent rotation and for independent lateral translation with respect to said capstan, a motor for driving said capstan, a resilient peripheral surface around the capstan, first torque motor means and first drive train means operatively coupled to said first carriage means to urge the supply roll into edge driven contact relation with respect to said peripheral surface, second torque motor means and second drive train means operatively coupled to said second carriage means to urge the take-up roll into edge driven contact relation with respect to said peripheral surface, said first torque motor means acting through its associated drive train to advance said first carriage and the axis of rotation of the supply roll toward said capstan during unwrapping of tape from the supply roll, resistance in said first drive train serving to dissipate a portion of the force developed by said first torque motor means to apply a predetermined compressive force between said capstan and supply roll, said second torque motor means acting through its associated drive train to urge said second carriage and the axis of rotation of the take-up roll toward said capstan during winding of tape upon the take-up roll, the axis of rotation of said take-up roll retreating from said capstan during winding of tape thereon, resistance in said second drive train being oriented to resist retreating movement of said take-up roll to add to the force developed by said second torque motor means to apply a predetermined compressive force between said capstan and take-up roll, the last named of said predetermined compressive forces being greater than the first named.

4. In a tape transport of a type adapted to support a length of pliable recording tape wrapped to form supply and take-up rolls, apparatus comprising means for supporting each of said rolls for rotation, rotary drive means having a resilient peripheral surface disposed in edge driving relation with respect to said rolls, a motor for driving said rotary drive means, torque motor means serving to urge the supply and take-up rolls into edge driven relation with respect to said peripheral surface to apply first and second compressive forces respectively between the supply roll and said rotary drive means and between the take-up roll and said rotary drive means, said second compressive force being greater than said first compressive force during a portion of the transfer of tape from said supply to said take-up roll.

5. A tape transport of the type adapted to support a length of pliable recording tape wrapped to form supply and take-up rolls, a drive capstan, first and second carriage means for respectively supporting each of said rolls for independent rotation and for independent lateral translation with respect to said capstan, a motor for driving said capstan, a resilient peripheral surface around the capstan, torque motor means and drive train means operatively coupled to transmit forces to said first and second carriage means operatively coupled to transmit forces to said first and second carriage means to urge said supply and take-up rolls into edge driven contact relation with respect to said peripheral surface, said drive train means including rack-and-pinion means serving to transmit forces developed by said torque motor means to each of said carriage means, said drive train means including a dissipative resistance serving to reduce the force transmitted to one of said carriage means and an additive resistance serving to increase the force transmitted to the other of said carriage means.

6. In a tape transport of a type adapted to support a length of pliable recording tape wrapped to form supply and take-up rolls, apparatus comprising rotary drive means having a resilient peripheral surface disposed to contact and drive said tape to feed same from a supply roll to a take-up roll, a motor for driving said rotary drive means, means including a torque motor serving to urge the tape with a first force against said surface at the supply side thereof and serving to urge the tape with a second force, greater than the first force, against said surface at the take-up side thereof during a portion of the transfer of tape from the supply to take-up roll, the last said means including resistances oriented to dissipate forces in providing said first force and oriented to become additive in providing said second force.

References Cited

UNITED STATES PATENTS 2,605,056 7/1952 De Kanski et al. ----- 242—54.1
2,733,069 1/1956 Frost et al. -------- 242—55.14

GEORGE F. MAUTZ, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,408,016 October 29, 1968

Kingston E. Ganske et al.

It is certified that error appears in the above identified patent and that said Letters Patent are hereby corrected as shown below:

Column 1, line 30, "discolsed" should read -- disclosed --. Column 6, lines 14 and 15, cancel "operatively coupled to transmit forces to said first and second carriage means".

Signed and sealed this 10th day of March 1970.

(SEAL)
Attest:

Edward M. Fletcher, Jr.
Attesting Officer

WILLIAM E. SCHUYLER, JR.
Commissioner of Patents